United States Patent
Shan et al.

(10) Patent No.: US 7,650,030 B2
(45) Date of Patent: Jan. 19, 2010

(54) METHOD AND APPARATUS FOR UNSUPERVISED LEARNING OF DISCRIMINATIVE EDGE MEASURES FOR VEHICLE MATCHING BETWEEN NON-OVERLAPPING CAMERAS

(75) Inventors: Ying Shan, West Windsor, NJ (US); Rakesh Kumar, West Windsor, NJ (US); Harpreet Sawhney, West Windsor, NJ (US)

(73) Assignee: Sarnoff Corporation, Princeton, NJ (US)

( * ) Notice: Subject to any disclaimer, the term of this patent is extended or adjusted under 35 U.S.C. 154(b) by 758 days.

(21) Appl. No.: 11/295,143

(22) Filed: Dec. 5, 2005

(65) Prior Publication Data

US 2006/0165277 A1 Jul. 27, 2006

Related U.S. Application Data

(60) Provisional application No. 60/633,201, filed on Dec. 3, 2004.

(51) Int. Cl.
*G06K 9/62* (2006.01)
(52) U.S. Cl. ............... 382/159; 382/155; 382/224
(58) Field of Classification Search ............ 382/103, 382/104, 155, 159, 160, 190, 224, 225, 228; 700/47
See application file for complete search history.

(56) References Cited

U.S. PATENT DOCUMENTS

| | | | |
|---|---|---|---|
| 5,311,600 A * | 5/1994 | Aghajan et al. ............ 382/156 |
| 5,566,246 A | 10/1996 | Rao |
| 6,081,766 A * | 6/2000 | Chapman et al. ............. 702/27 |
| 6,545,705 B1 | 4/2003 | Sigel et al. |
| 6,687,386 B1 | 2/2004 | Ito et al. |
| 6,747,687 B1 | 6/2004 | Alves |
| 2003/0216630 A1 * | 11/2003 | Jersey-Willuhn et al. .... 600/407 |
| 2005/0180639 A1 * | 8/2005 | Trifonov et al. ............. 382/225 |
| 2005/0185834 A1 * | 8/2005 | Kristjansson et al. ....... 382/154 |

OTHER PUBLICATIONS

Javed et al. ("Tracking across multiple cameras with disjoint views", IEEE Int'l Conf. on Computer Vision, vol. 2, Oct. 13-16, 2003, pp. 952-957).*
Peng et al. (Images similarity detection based on directional gradient angular histogram, IEEE Proc. ICPR, Aug. 11-15, 2002, vol. 1, pp. 147-150).*
Olson et al. ("Automatic target recognition by matching oriented edge pixels", IEEE Transactions on Image Processing, vol. 6, No. 1, Jan. 1997, pp. 103-113).*
Cai et al. ("Tracking human motion using multiple cameras", IEEE Proc. ICPR 1996, pp. 68-72).*
Wu et al. ("Discriminant-EM algorithm with application to image retrieval", IEEE Proc. IC-CVPR 2000, vol. 1, pp. 222-227).*
Kang et al. ("Multiple camera tracking system with seamless object handover", SPIE vol. 4303, 2001, pp. 27-34).*
Fergus et al. ("Object class recognition by unsupervised scale-invariant learning", IEEE Proc. IC-CVPR 2003, vol. 2, pp. 264-271).*

* cited by examiner

*Primary Examiner*—Yubin Hung
(74) *Attorney, Agent, or Firm*—Lowenstein Sandler PC

(57) ABSTRACT

A method and apparatus for unsupervised learning of measures for matching objects between images from at least two non-overlapping cameras is disclosed The method includes collecting at least two pairs of feature maps, where the at least two pairs of feature maps are derived from features of objects captured in the images. The method further includes computing, as a function of at least two pairs of feature maps, at least one first and second match measures, wherein the first match measure is of a same class and the second match measure is of a different class.

18 Claims, 19 Drawing Sheets

400

500

| Pointwise Distance and Inlier Percentage | Angular Distance and Inlier Percentage | Magnitude Distance and Inlier Percentage |

$$[\underbrace{X_1, X_2}_{602}, \underbrace{X_3, X_4}_{604}, \underbrace{X_5, X_6}_{606}]$$

| $C_i$ | $C_j$ | $\mu_d$ | $\sigma_d$ | $\mu_a$ | $\sigma_a$ | $\mu_m$ | $\sigma_m$ |
|---|---|---|---|---|---|---|---|
| 3 | 1 | 1.73 | 1.30 | 0.002 | 0.15 | -0.02 | 2.98 |
| 7 | 3 | 1.73 | 1.29 | 0.005 | 0.15 | -0.06 | 3.31 |
| 2 | 4 | 1.19 | 0.89 | -0.001 | 0.17 | -0.11 | 3.42 |
| 11 | 7 | 1.40 | 1.06 | 0.001 | 0.13 | -0.06 | 2.96 |
| 4 | 8 | 1.11 | 0.87 | 0.000 | 0.17 | -0.15 | 4.34 |
| 15 | 11 | 1.72 | 1.27 | -0.002 | 0.15 | -0.21 | 3.14 |
| 8 | 12 | 1.30 | 0.93 | -0.002 | 0.14 | -0.14 | 3.74 |
| 12 | 16 | 1.44 | 1.04 | 0.007 | 0.14 | -0.10 | 4.78 |

| Measures | $d$ | $c^d$ | $\bar{o}$ | $c^o$ | $\tilde{m}$ | $c^m$ |
|---|---|---|---|---|---|---|
| Weights | $w_0$ | $w_1$ | $w_2$ | $w_3$ | $w_4$ | $w_5$ |
| 3    1 | 0.05 | 0.02 | 0.14 | 0.05 | -0.12 | 0.07 |
| 7    3 | 0.08 | 0.03 | 0.12 | 0.18 | 0.03 | 0.06 |
| 2    4 | 0.04 | -0.01 | -0.13 | 0.18 | -0.07 | 0.10 |
| 11   7 | 0.01 | 0.00 | -0.01 | 0.12 | 0.32 | 0.27 |
| 4    8 | 0.05 | -0.01 | 0.14 | 0.13 | -0.04 | 0.08 |
| 15   11 | 0.01 | 0.00 | -0.15 | 0.03 | 0.06 | 0.04 |
| 8    12 | -0.17 | -0.07 | 0.13 | 0.05 | 0.00 | 0.08 |
| 12   16 | -0.08 | 0.24 | 0.05 | 0.26 | -0.14 | 0.09 |

| $C_i$ | $C_j$ | Total | Top 2 | Percentage |
|---|---|---|---|---|
| 3 | 1 | 195 | 186 | 95.38 |
| 7 | 3 | 197 | 193 | 97.97 |
| 2 | 4 | 152 | 148 | 97.37 |
| 11 | 7 | 228 | 220 | 96.49 |
| 4 | 8 | 166 | 165 | 99.4 |
| 15 | 11 | 210 | 193 | 91.9 |
| 8 | 12 | 185 | 172 | 92.97 |
| 12 | 16 | 186 | 173 | 93.01 |

FIG. 18

METHOD AND APPARATUS FOR UNSUPERVISED LEARNING OF DISCRIMINATIVE EDGE MEASURES FOR VEHICLE MATCHING BETWEEN NON-OVERLAPPING CAMERAS

CROSS-REFERENCE TO RELATED APPLICATIONS

This application claims the benefit of U.S. provisional patent application No. 60/633,201, filed Dec. 3, 2004, which is herein incorporated by reference.

GOVERNMENT RIGHTS IN THIS INVENTION

This invention was made with U.S. government support under contract number NBCH030085. The U.S. government has certain rights in this invention.

BACKGROUND OF THE INVENTION

1. Field of the Invention

The present invention relates to image processing. In particular, this invention relates to a method and apparatus for unsupervised learning of discriminative edge measures for vehicle matching between images from non-overlapping cameras.

2. Description of the Related Art

Visual object recognition is an important component of image processing for matching a movable object between two non-overlapping cameras, and prior research and development has provided a number of mechanisms for performing such visual object recognition. For example, visual object recognition may be determined as a function of (i) edge-based object matching, and (ii) learning robust and discriminative measures for classification.

Object matching using edge features has proven to be reliable. For example, edge features have been used to detect traffic signs and pedestrians, and even recognize hand gestures. Examples of prior edge-based match measures include Chamfer distance, Hausdorff distance, and Earth Mover's distance. In addition, both edge locations and edge orientations may be used to define a combined edge measure, which may be used to improve performance of the matching and classification. A SIFT descriptor may use aggregated measures computed from both gradient orientation and magnitude so as to tolerate slight location errors.

Despite the prior research and development, two issues related to edge-based measures exist. These issues include robustness and feature selection and combination. Many prior works have disclosed using clean edge maps for at least one of two edge maps. Truncated Chamfer distance or robust Hausdorff distance, for instance, may work for when one edge map is clean, but not when both edge maps are not clean.

The issues of feature selection and combination of discriminative edge measures focus on maximizing the overall classification performance. To address this, others have used learning discriminative image features with a limited set of labeled data based on a semi-supervised learning approach. In addition, others have addressed on-line selection of discriminative color features for tracking. In this case, learning is based on a set of foreground pixels and background pixels labeled by the tracker with a "center-surround" approach. However, a result can be biased by pixels that are incorrectly labeled.

Therefore, there is a need in the art for a method and apparatus that provides for unsupervised learning of discriminative edge measure for vehicle matching between non-overlapping cameras that is unsupervised and does not involve a fixed label set.

SUMMARY OF THE INVENTION

The present invention is a method and apparatus for for unsupervised learning of measures for matching objects between images from at least two non-overlapping cameras. In one aspect, the invention processes images from the non-overlapping cameras, collects at least one two pairs of feature maps, where the at least one two pairs of feature maps are derived from features of objects captured in the images. The invention further includes computing, as a function of the two pairs of feature maps, at least first and second match measures, wherein the first match measure is of a same class and the second match measure is of a different class. Objects in the same class are deemed to match.

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein:

FIGS. 5 and 6 are block diagrams illustrating example elements of a method for edge feature computation;

FIG. 16 is a table that lists example parameters of inlier distributions of three raw measures for 8 pairs of cameras;

FIG. 17 is a table that lists example weights of the corresponding measures computed for the 8 pairs of cameras;

FIG. 18 is a table that lists example ranking results computed for 8 pairs of cameras;

DETAILED DESCRIPTION

The present invention is a method and apparatus for object matching between images created by non-overlapping cameras. The method and apparatus are particularly useful for performing unsupervised learning of discriminative measures for vehicle matching between images created by non-overlapping cameras.

Tracking people, vehicles and other objects can be used by various applications to provide a number of important safety, security and other beneficial purposes. These applications may be pertinent to any number of products and industries, including automotive and transportation products and industries, entertainment products and industries, digital media products and industries, healthcare products and industries, life sciences products and industries, homeland security, image sensors and cameras, etc.

In one embodiment, a method for matching road vehicles or other movable objects between images from at least two non-overlapping cameras is provided. Herein, matching is a function of classifying two observations of objects from images created by the two non-overlapping cameras into either a "same classification" or into "different classifications" (collectively "same/different classification"). Such same/different classification is based on a probability of the two observations being of the same vehicle or from different vehicles.

In this embodiment, the method includes deriving at least one measurement vector that has one or more edge-based measures computed from at least one pair of aligned edge maps. The edge based measures may be, for example, three independent edge-based measures.

The method also includes determining a weight of a match measure by unsupervised learning so as to separate a same class from a different class. By determining a weight of a match measure by unsupervised learning, the same/different classification may be optimally separated in a combined measurement space. A robustness of the match measure and the use of discriminant analysis in classification may ensure that the method outperforms existing edge-based approaches, especially in the presence of missing or false edges. Such false edges may be caused by shadows, differing illumination conditions and/or systematic misalignment caused by one or more different camera configurations.

Figure 1:
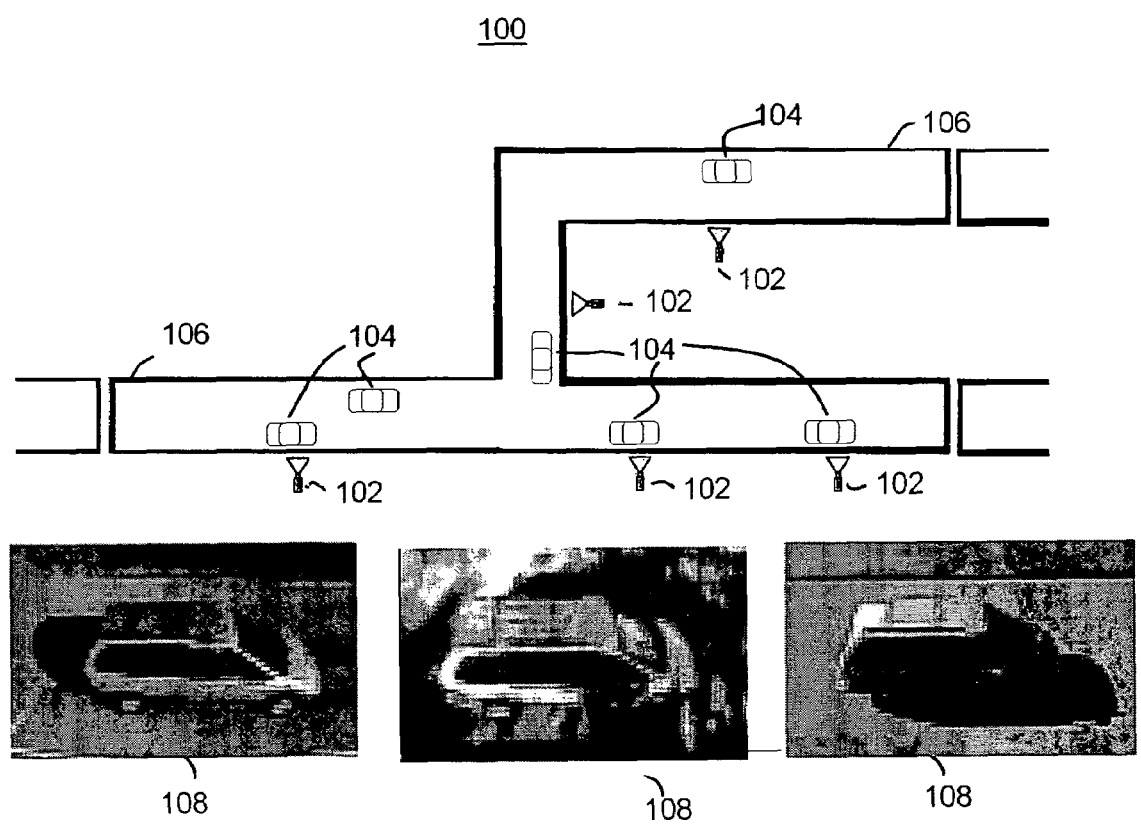
FIG. 1 is a block diagram illustrating an example of tracking a vehicle across a network of non-overlapping cameras.

FIG. 1 is a block diagram illustrating example architecture 100 for tracking a vehicle using a network of cameras 102 where the cameras provide a non-overlapping field of view ("non-overlapping cameras"). The architecture 100 includes, for example, a number of vehicles 104 representing moveable objects that may be monitored by the non-overlapping cameras 102 while traveling on one or more roads 106. Of course, the example architecture 100 may be used to track any kind of object or subject.

Using the architecture 100, the non-overlapping cameras 102 may capture sample images 108 that have varying lighting and poses. A separation between each of the non-overlapping cameras may be hundreds of meters. Instead of using images with large amounts of extraneous information, in-camera trackers provide "vehicle chips" for processing. That is, the in-camera trackers may crop (e.g., using a bounding box or other bordering mechanism) or otherwise transform each of the sample images 108 to yield an corresponding image having a majority dedicated to the vehicle.

Each of the non-overlapping cameras 102 may be installed along a roadside at a given separation so as to prevent overlap. That is, a field of view of each of the non-overlapping cameras 102 does not overlap. As a result, the vehicles 104 need to be matched to determine that an image of a first vehicle captured by one of the non-overlapping cameras contains an image of the same vehicle in another image from another camera.

Figure 2:
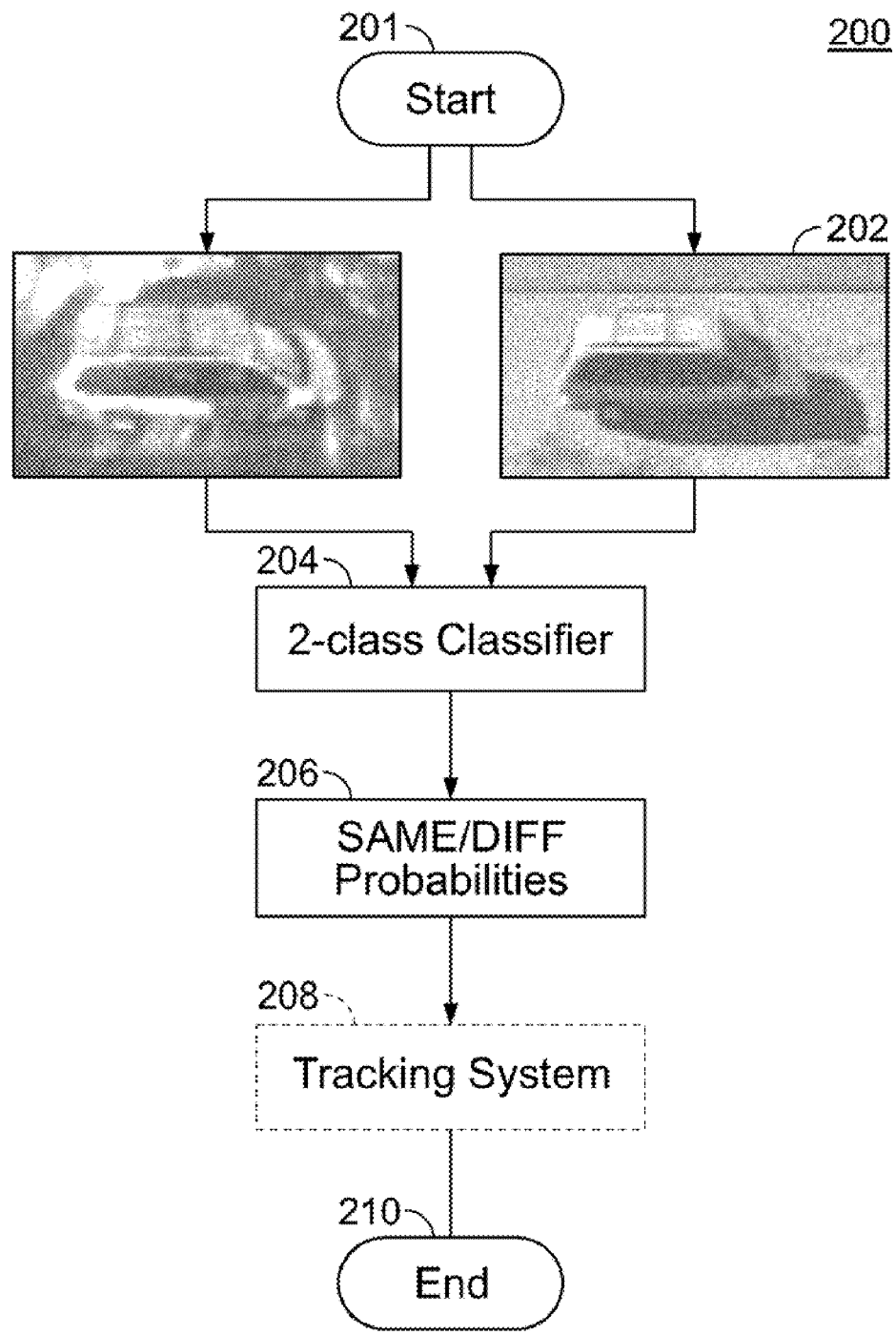
FIG. 2 is a flow diagram illustrating an example of a method for matching objects in images.

FIG. 2 is a flow diagram illustrating an example method 200 for matching objects in images. The method 200 starts at termination block 201 and proceeds to process block 202. At process block 202, a pair of vehicle images 202 is received from a respective pair of the non-overlapped cameras 102. At process block 204, a two-class classifier is determined for the respective pair of images from the non-overlapped cameras 102. At process block 206, a probability that the images are from the same vehicle or from different vehicles 206 is computed. At process block 208, a probability of a match is provided to a vehicle tracking system 208. The method 200 terminates at a second termination block 210.

Figure 3:
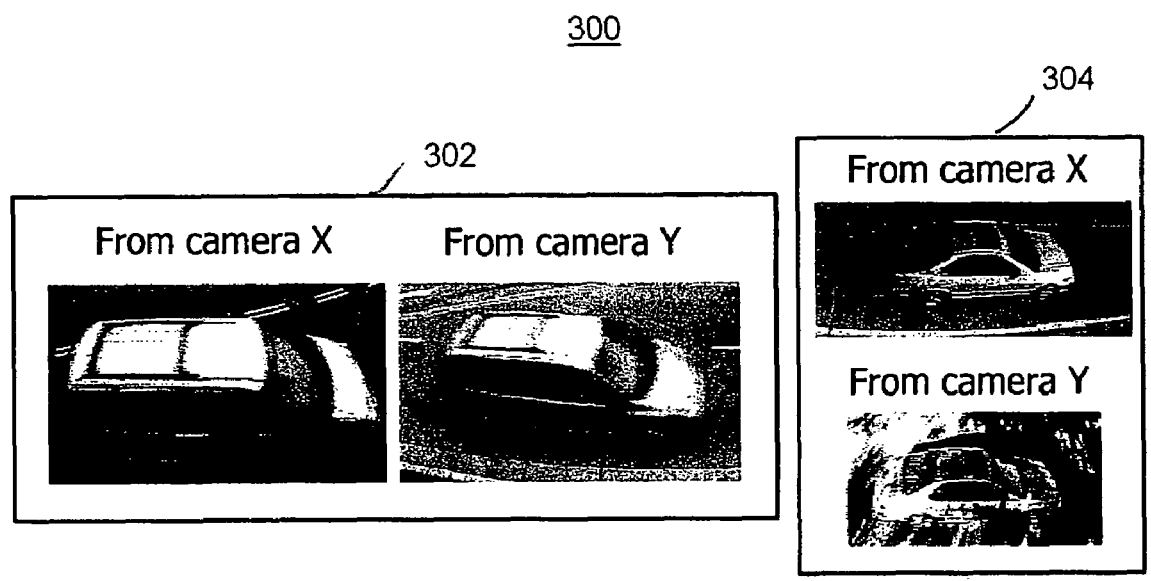
FIG. 3 is a block diagram illustrating a number of example appearance changes in objects.

FIG. 3 is a block diagram illustrating examples 300 of appearance changes in objects. The examples 300 include images of a first object ("first images") 302 and images of a second object ("second images") 304. The first images were captured by two different the non-overlapping cameras, and the second images were captured by the same non-overlapping camera. The first and second images 302, 304 may exhibit differing appearances, such as size, angle, illumination and shadows. Such differences may occur in the first and/or second images of the same object from the same cameras can vary at different times of day, as shown in FIG. 4.

Figure 4:
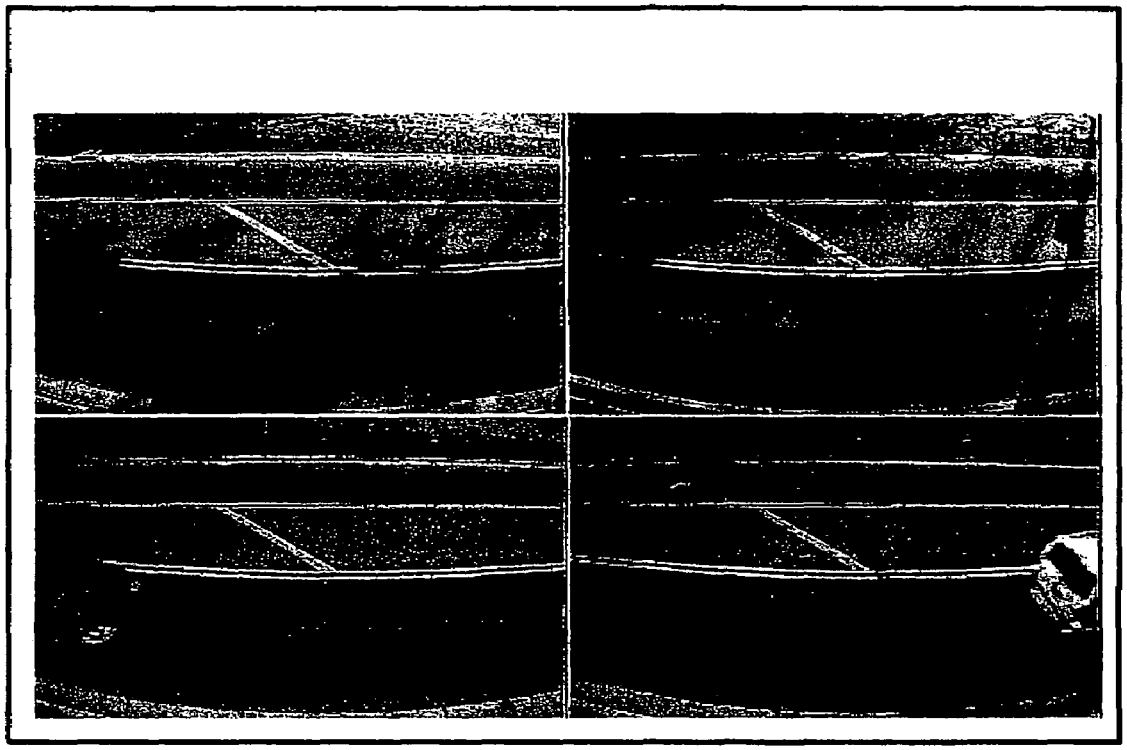
FIG. 4 is a block diagram illustrating example images from a single camera at four different times of the day.

FIG. 4 is a block diagram illustrating example images 400 captured at four different times of the day by one non-overlapping camera in a network of non-overlapping cameras. Illumination changes may occur for many reasons, such as the time of day or weather conditions. Because of the illumination changes, a fixed same/different classifier does not cover all the changes. Manual labeling is not practical solution, especially for the system architecture 100 or any other architecture that may operate seven days a week, 24-hours a day under continually changing illumination conditions.

On the other hand, no manual labeling process is required when using unsupervised learning as described above and below. In one embodiment, the unsupervised learning may be performed using learning of a discriminative edge feature. As part of the learning of a discriminative edge feature, an edge feature computation is performed. This edge feature computation in relatively stable with respect to illumination changes; the edge feature computation is a good shape descriptor for objects, such as vehicles; and runs in real time and/or near-real time. The discriminative edge feature provides an optimal combination for maximal discriminating power as compared to non-discriminative edge features.

Figure 5:
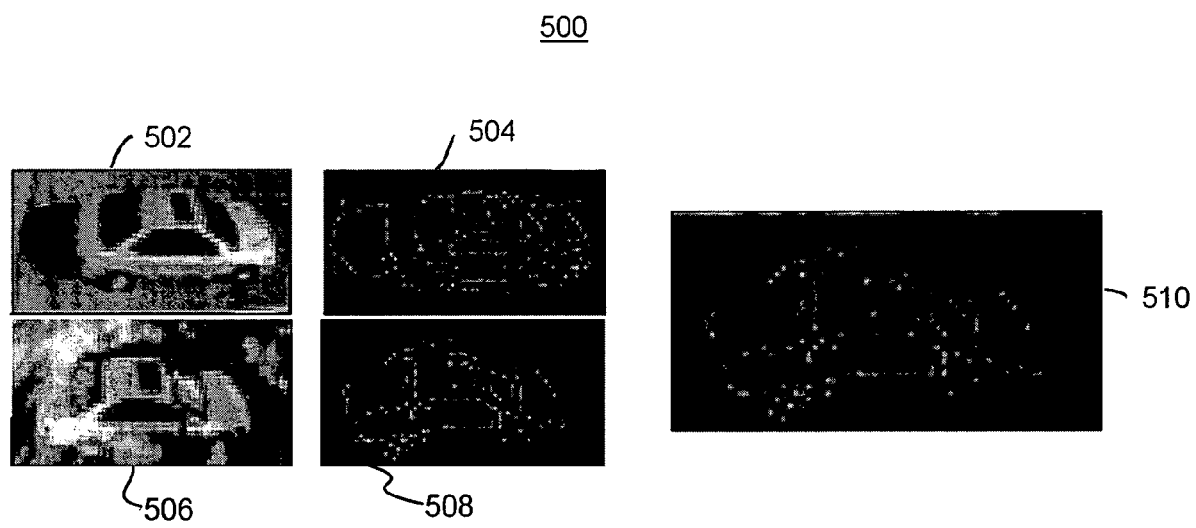
Figure 7:
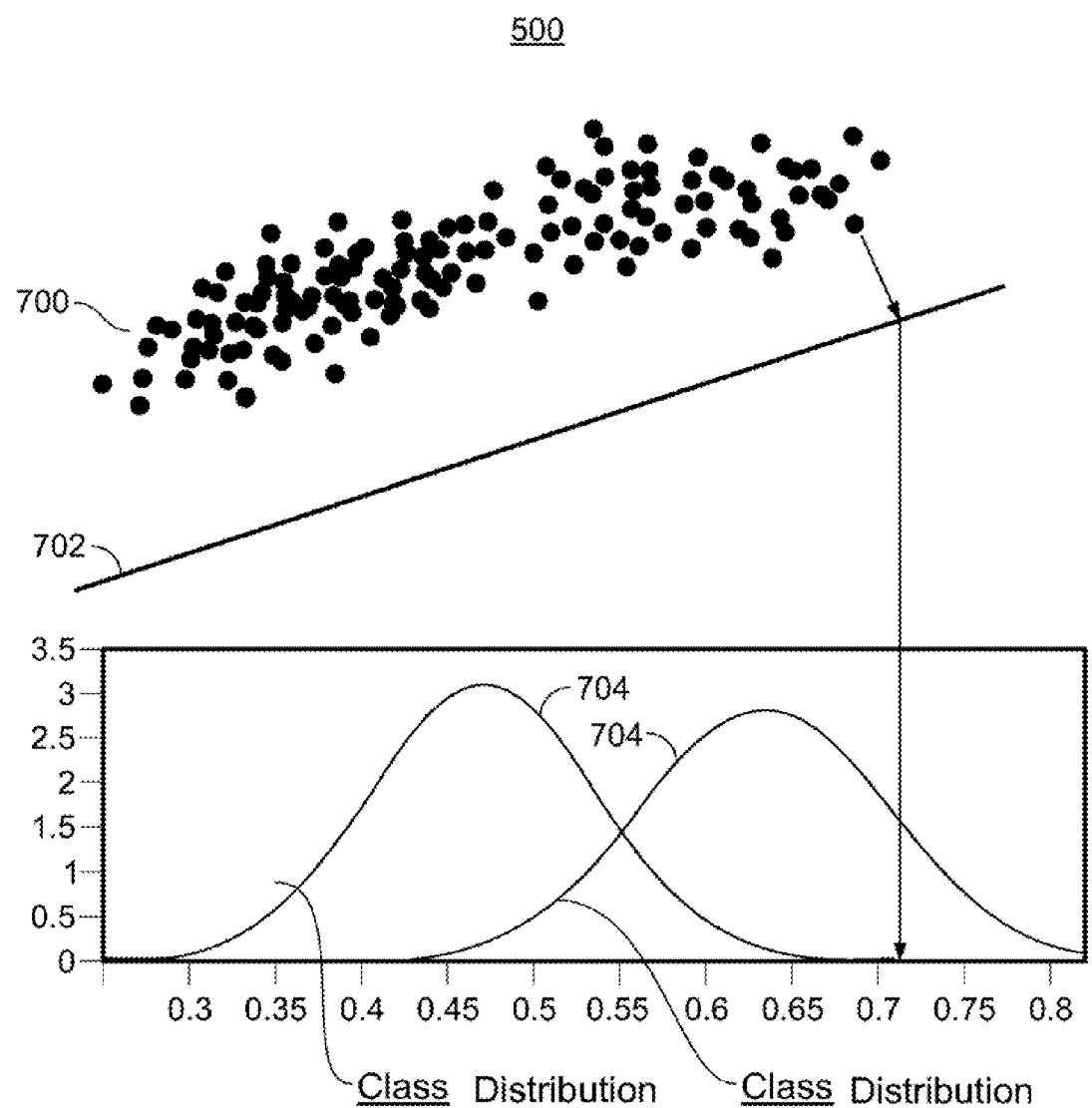
FIG. 7 is a chart illustrating an example elements of a method for edge feature computation.

FIGS. 5 and 6 are block diagrams illustrating example elements 500 of a method for edge feature computation, and FIG. 7 is a chart illustrating example elements 500 of the method for edge feature computation. The example elements 500 include a first image 502, a second image 506, and edge maps 504, 508 that are derived from the first and second images 502, 506.

In one embodiment, a process of edge-based alignment is used to determine whether the objects in the first and second images are the same or different. This process of edge-based alignment may performed by generating an edge map alignment 510. In addition, a six-dimensional feature may be derived from a pixel-wise edge distance, an angle difference, magnitude difference, inlier percentages and/or outlier percentages.

As shown in FIG. 6, a six-dimensional vector combines an inlier percentage with each measures of point-wise distance 602, angular distance 604, and magnitude distance 606. The point-wise distance 602 is sensitive to translation scale errors. The angular distance 604 is sensitive to rotation error. The magnitude distance 606 is sensitive to illumination change. Using the six-dimensional vector, the discriminative edge feature becomes an optimal linear combination of the six-dimensional edge features, i.e., $x=W*X^T$. The optimal weights are computed using Fisher's Linear Discriminant, for each pair of the non-overlapping cameras 102.

As shown in FIG. 7, using Fisher's Linear Discriminant, the six-dimensional vector 700 is projected to a one-dimensional vector 702 along a line defined by W that maximizes the separation between the two classes, i.e., the different class and the same class. Each class is fitted with a Gaussian distribution 704. The same/different distributions may tend to form two Gaussian distributions.

One embodiment of unsupervised learning of discriminating edge features is performed without manual labeling. To avoid such labeling, a sample set is automatically collected with a sufficient amount of same/different samples, and an optimal weight, w, is found automatically for the six-dimensional edge feature vector; examples of which are described in more detail below.

Figure 8:
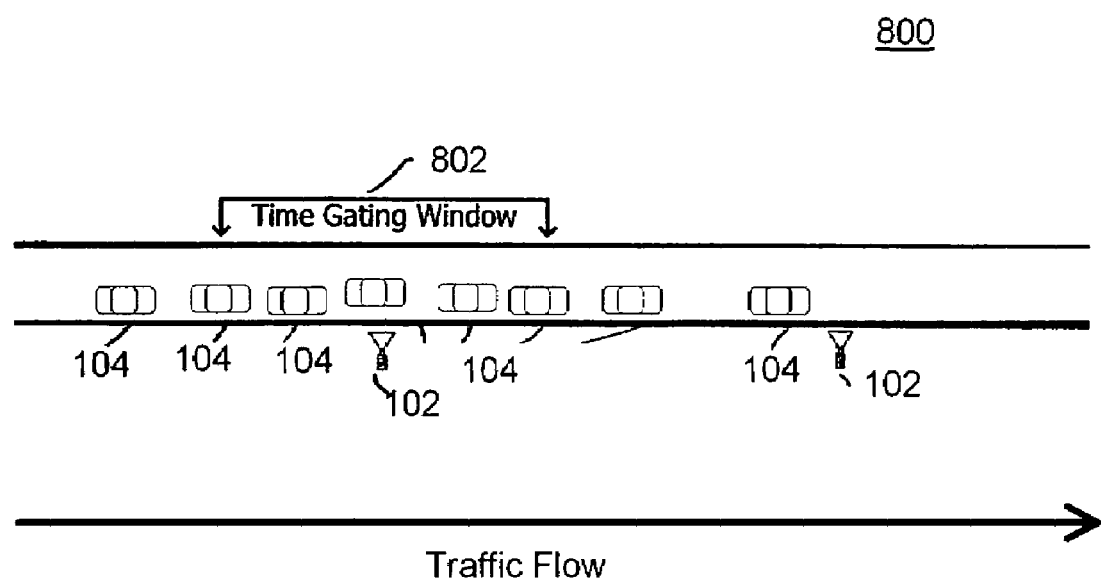
FIGS. 8 and 9 are block diagrams illustrating an example method for sample collection.
Figure 9:
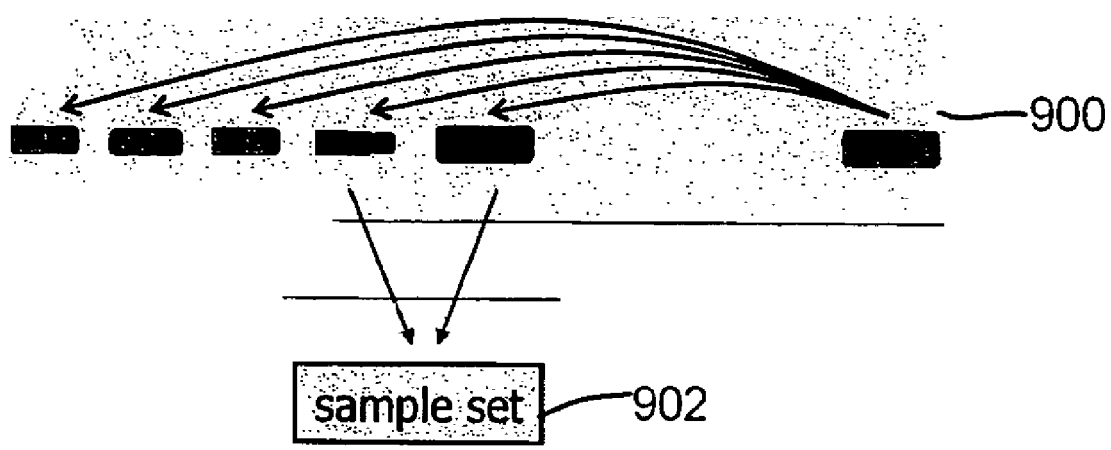

FIGS. 8 and 9 are block diagrams illustrating examples of a method of sample collection 800. FIG. 8 illustrates time gating. For each vehicle 104 on a right camera 102, all vehicles on its left within the time window 802 are selected as initial candidate vehicles.

FIG. 9 illustrates a process of using a ranking score to produce a sample set. The candidate vehicles are matched and sorted 900 according to a ranking score. A predetermined threshold determines the top by rank, e.g., top k=2, to go to the sample set 902. The ranking score may be based on a pixel-wise distance and angle difference, and may be a robust measure based on truncated ramp function. As discussed in detail below, no training data is required for determining the ranking score.

Figure 10:
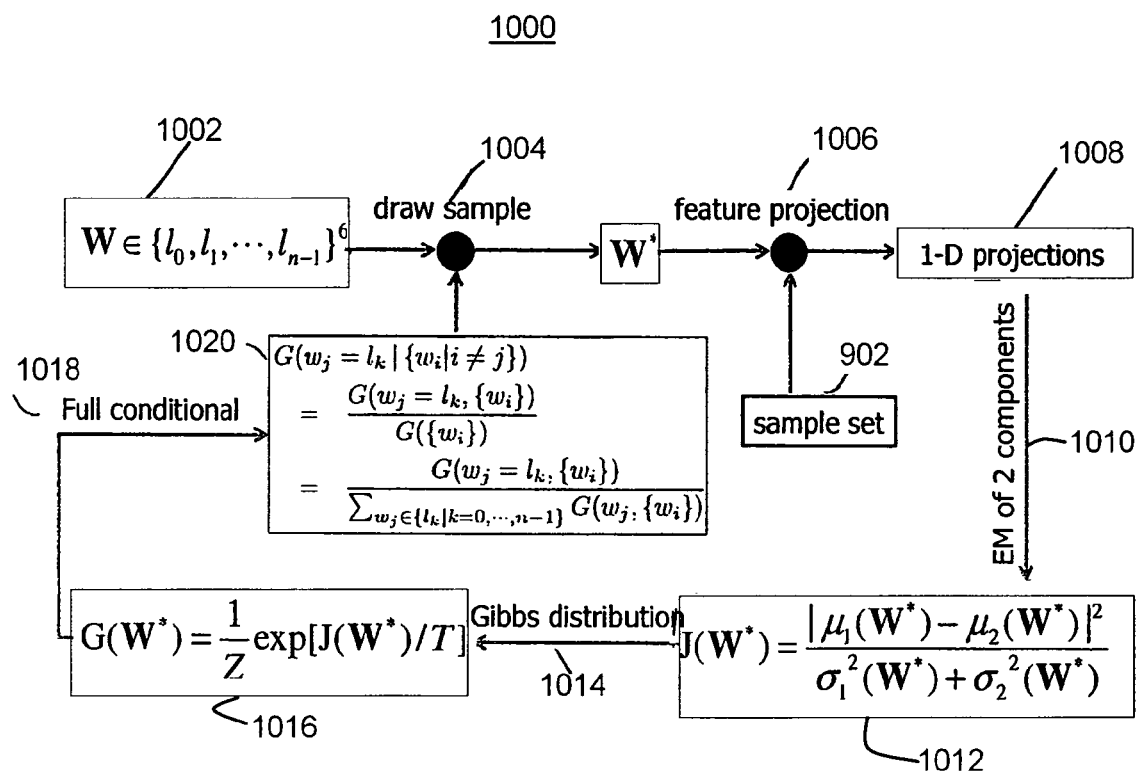
FIG. 10 is a block diagram illustrating an example method for unsupervised learning.

FIG. 10 is a block diagram, illustrating an example method 1000 of unsupervised learning with and Expectation-Maximization (EM) algorithm and Gibbs sampler. The method 1000 determines the weights 1002 in a six-dimensional vector without manual labeling.

The weights 1002 may be determined by searching within the six-dimensional vector space to find an optimal solution. For instance, a sample may be drawn by randomly drawing a discretized sample ("W*") 1004 from the six-dimensional vector space. The sample W* 1004 is used to provide feature projection 1006 of the sample set 902 and to combine the six-dimensional vector into a 1-D projection 1008.

The EM algorithm has two components 1010 and is used automatically compute the mean and variance, $\mu_1$, $\mu_2$, $\sigma_1$, and $\sigma_2$, parameters of two Gaussian distributions. Using these parameters, a function to optimize, J(W*) 1012, is computed. The function to optimize J(W*) 1012 represents the separation between the two Gaussian distributions. The discretized sample W* that maximizes function to optimize J(W*) 1012 is selected to combine the six-dimensional vectors into a single score.

There are many ways to find the W*. One approach is to form a Gibbs distribution 1014 from function to optimize J(W*) 1012 called G(W*) 1016. The G(W*) 1016 using a full conditional 1018 and equations 1020 to compute the next W* to choose based on the current weight Iterations are performed from 1004 to 1020 until the process converges with the optimal W.

Figure 11:
FIG. 11 is a block diagram illustrating examples of objects in databases.

FIG. 11 is a block diagram illustrating examples of objects 1100 in databases. These examples were collected from eight pairs of the non-overlapping cameras 102 within about thirty minutes. Although the examples include various vehicles, the present invention is not limited to vehicles, but encompasses all kinds of objects and subjects that can be monitored or tracked by a camera system, including people.

Figure 12:
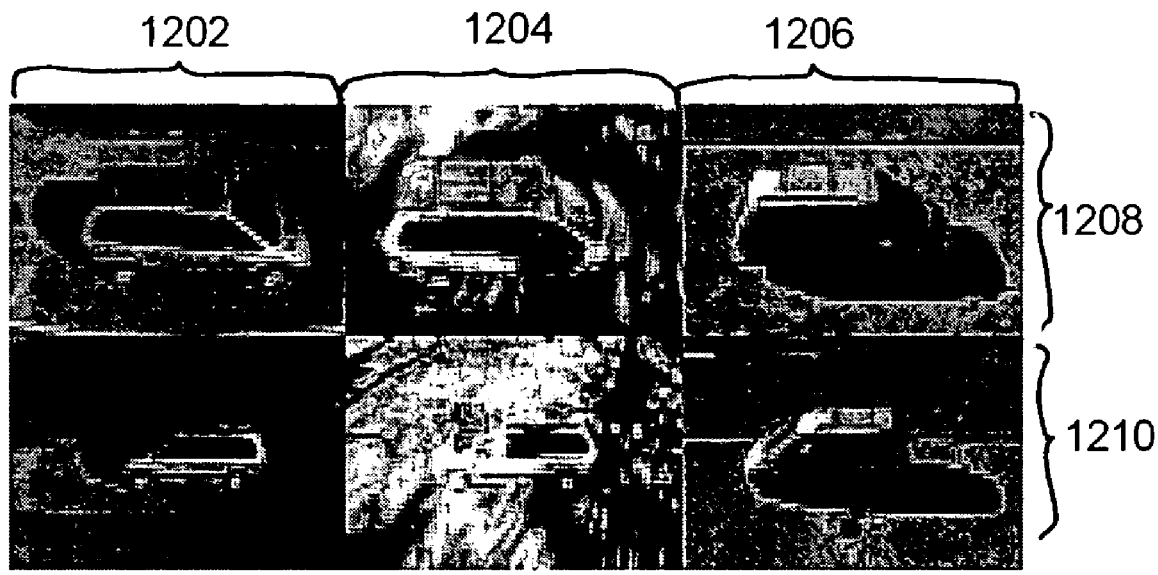
FIG. 12 is a block diagram illustrating example images of a vehicle captured by multiple cameras.

FIG. 12 is a block diagram illustrating example matrix 1200 containing images of the same vehicle from a multiple of the non-overlapping cameras 102 that together demonstrate a variety of changes in appearance and pose. The matrix 1200 includes first, second and third columns of images 1202-1206. The first column of images 1202 are captured by a first of the non-overlapping cameras 102, the second column of images 1204 are captured by a second camera of the non-overlapping cameras 102, and the third column of images 1206 are captured by a third camera of the non-overlapping cameras 102. A field of view for the first, second and third non-overlapping cameras 102 do not overlap.

Although the matrix 1200 includes Images from the same vehicle, the appearance can be drastically different among such images. For example, in the first column 1202, there is a shadow on the left side. In the second column 1204, there are shadows on the vehicle body. In the third column 1206, there is a shadow on the right side, from a different angle than in the first column 1202. In the first row 1208 the vehicle is driving in one direction and, in the second row 1208, the same vehicle is driving in the opposite direction. Comparing the vehicle in images in the first row to images in the second row, the size and orientation also are different. Thus, the same vehicle can have a very different appearance (e.g., size, illumination, and the like) in different images 1200.

Various embodiments of the present invention address a problem of matching vehicles as they are imaged in non-overlapping fixed cameras along a road network. The cameras are roughly oriented perpendicular to the direction of motion along the road. One component of maintaining a track of vehicles over multiple cameras is feature-based vehicle matching between observations from a pair of cameras.

In addition to the cameras being physically different with different optical and internal geometric characteristics, the temporal and spatial separation between two observations from two cameras involves changes due to pose of vehicles, illumination conditions and the position of shadows due to environmental structures, such as trees, light poles, and buildings. The vehicle matching approach described herein combines approximate knowledge of the relative geometry of vehicles and cameras, with robust match measures and discriminant analysis to compute the probability of two observations being of the same vehicle versus different vehicles. The approach incorporates edge feature extraction, discriminant-based combinations of robust match measures and unsupervised learning.

The vehicle matching problem can be posed as a two class classification problem, where a discriminative match score is computed by combining multiple edge-based measures through unsupervised learning. A classifier produces a probability of the score between observations from two cameras given that the observations belong to the same vehicle and the probability of the score given that the observations belong to different vehicles. Given the two-class probabilities, a global tracker that maintains multiple hypotheses for vehicles across multiple cameras can make decisions based on multi-hypotheses filters, such as the Joint Probability Density Association Filter or Probabilistic Multi-Hypotheses Tracker.

One step involves learning of same and/or different probability density functions. A multidimensional measurement vector is computed, and its use can be demonstrated in learning these distributions in an unsupervised mode. In the unsupervised mode, the learning these distributions may be performed using a sampling algorithm that (i) efficiently exploits the space of the weights, and (ii) finds an optimal solution for combining the edge measures.

The unsupervised discriminative learning framework is not limited to and independent of any specific features. For instance, other features, such as shape context, sift features, spin images, etc., may also be used. Edge-based measures are chosen, however, because edge features are the dominant features in vehicular objects and are relatively stable over aspect and illumination variations. Each edge map is computed from the masked area of a vehicle chip, where the masks are provided by a real-time tracker running on each of the non-overlapping cameras 102 in the road network.

For a given pair of the non-overlapping cameras 102, $C_i$ and $C_j$, estimate the probability density functions as:

$$P(y|same, C_i, C_j) \equiv P(y|S_{i,j})$$

$$P(y|different, C_i, C_j) \equiv P(y|D_{i,j}), \quad (1)$$

where $P(y|D_{i,j})$ and $P(y|S_{i,j})$ are the probability density function of the match score y given that the two observations are of same/different vehicles classification, and $$y = f_{i,j}(E_k^i, E_l^j), \quad (2)$$

where y is a scalar function of two observed edge maps, $E_k^i$ and $E_l^j$, corresponding to the kth and lth observations in the non-overlapping cameras 102, $C_i$ and $C_j$, respectively.

The two edge maps are assumed to have been approximately aligned using parametric alignment models and Iterative Closest Point (ICP) algorithm, but both could be contaminated by noise, scene clutter, and obscuration. Each edge map is also time stamped in one embodiment.

Learning Robust Edge Measures

Figure 13:
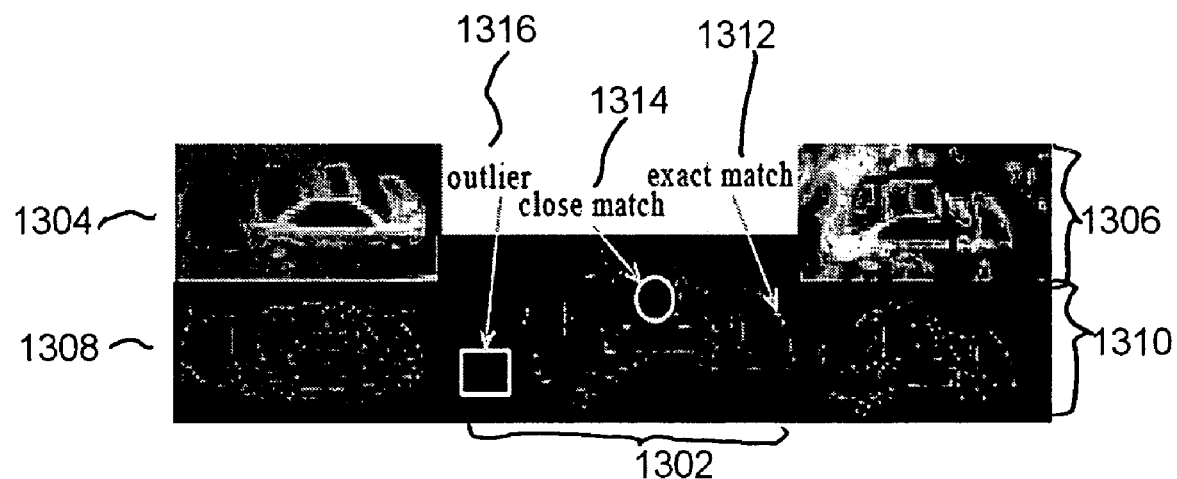
FIG. 13 is a block diagram illustrating an example alignment result of two edge maps and their corresponding images.

FIG. 13 is block diagram illustrating an example alignment result 1300 of two edge maps and their corresponding images. The alignment result 1300 includes an example of an edge map alignment 1302 of two vehicle images 1304 being matched, 1306 and their corresponding edge maps 1308, 1310.

The edge maps 1308, 1310 are a representation generated or derived from the image that looks kind of like an outline of the vehicle. The edge maps 1308, 1310 include various edges, and mat be used to match the two vehicles images. There are many ways to measure similarity between the two edge maps 1308, 1310 are. One way is determining a discriminative match score.

Within the edge map alignment 1302, is an exact match 1312, a close or approximate match 1314, and an outlier 1316. In one embodiment, information content in the edge maps 1308, 1310 is exploited by computing a six-dimensional measurement vector. A match measure incorporates the different types of matches, e.g., exact, close, approximate, or outlier.

Three components measure spatial, orientation, and magnitude differences between matching features. Separation of matching features into sets of inliers and sets of outliers provides another set of useful match measures, namely, a coverage of features for each match measure.

Each set of inliers for a match measure gives a percentage of the features included in the match measure. Ideally, matching observations should not only have low distances corresponding to the three matching features, but for each feature, the coverage should be high, thereby, indicating that a high degree of correlation is present between the two edge maps. Thus, each of the three match measures may be augmented with its corresponding coverage measure. The optimal combination of the component match measures is then determined by a process of learning discriminant edge measures, in one embodiment.

Raw Edge Measures

Figure 14:
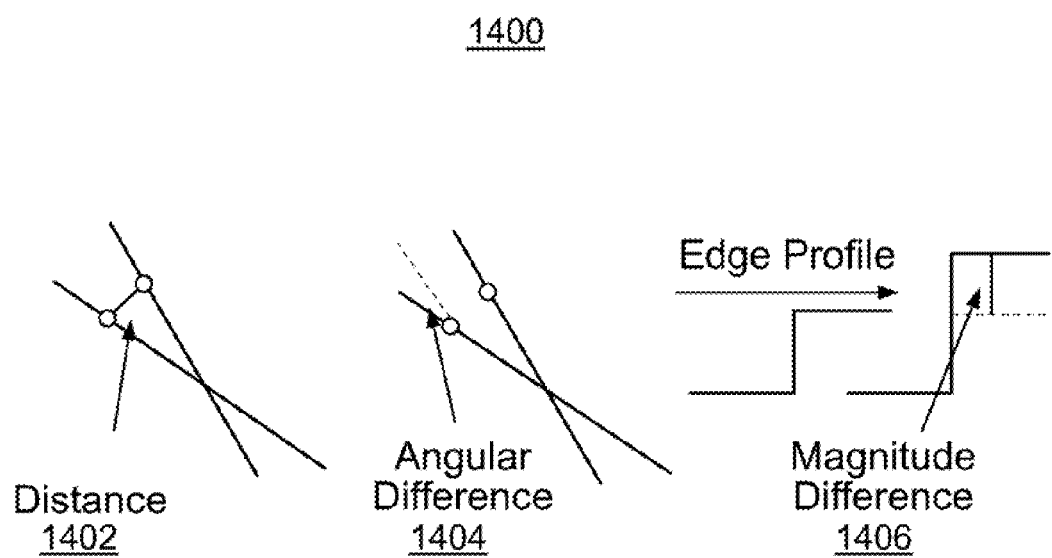
FIG. 14 is a block diagram illustrating example raw measures.

FIG. 14 is a block diagram illustrating example raw measures 1400 or building blocks for the match measure, including point-wise distance 1402, angular difference 1404, and gradient magnitude difference 1406. The two lines for the point-wise distance 1402 are each from different edge maps (see e.g., FIG. 13, close match 1314.) A match measure is formed from a distance between edges, between two close points on two lines, and the like. Similarly, the angular difference 1404 is determined between two close points on two lines and the gradient magnitude difference 1406 is computed from differences in edge strength between two edges.

The six-dimensional match measure is derived from the three pixel-to-pixel measures as shown in FIG. 14. Suppose that M and I are two aligned edge point sets, p is a point in M and q is the closest point p in I, define $$d_{M \to I}^p = \|p - q\|_1, \quad (3)$$

$$a_{M \to I}^p = \theta_p - \theta_q, \quad (4)$$

$$m_{M \to I}^p = mag_p - mag_q, \quad (5)$$

where d, a, and m denote distance, angular difference, and magnitude difference, respectively; $\theta_{\{p,q\}}$ and $mag_{\{p,q\}}$ are the edge directions, and gradient magnitudes defined on the edge points p and q, respectively. The subscript M→I denotes that the closest point is defined from M to I.

Derived Edge Measures

Based on the three raw measures, the distance measure between a pair of edge maps is derived as:

$$v_{M \to I} = [\tilde{d}, c^d, \tilde{a}, c^a, \tilde{m}, c^m], \quad (6)$$

where the subscript M→I denotes that the measure is defined symmetrically. The first measure $\tilde{d} \equiv \tilde{d}_{M \to I}$ is the average inlier distance defined as:

$$\tilde{d} = \frac{\sum_{p \in G_{M \to I}^d} d^p + \sum_{p \in G_{I \to M}^d} d^p}{N(M) + N(I)}, \quad (7)$$

where $G_{X \to Y}^d$ is the set of points in X corresponding to the inlier distances defined from X to Y and N(X) is the number of total edge points in X. Whether a distance measure is an inlier or an outlier is determined by estimating inlier and outlier distributions. The second dimension $c^d \equiv c_{M \to I}^d$ is the cardinality of the set of points covered by the inlier distances and is defined as:

$$c^d = \frac{N(G_{M \to I}^d) + N(G_{I \to M}^d)}{N(M) + N(I)}. \quad (8)$$

The other four measures related to the raw angular difference and magnitude difference m are defined in a similar way.

Estimating Inlier and Outlier Distributions

A raw measure $x^p, x \in \{d,a,m\}$ at a point p can be classified as an inlier or an outlier as follows:

$$x^p \in G^x, \text{ if } B_x(x^p) < G_x(x^p), B^x, \text{ otherwise} \quad (9)$$

where $B^x$ is the set of outliers for the raw measure x, $B_x$ the probability density function of outliers and $G_x$ is the density function of inliers. Assuming that both $B_x$ and $G_x$ are Gaussian, the parameters of these distributions can be computed by collecting a set of aligned edge maps $\{M_i \leftrightarrow I_j\}$, and computing raw measures $x_{M_j 43\ I_i^p}$ and $x_{I_j 43\ M_i^p}$ for all the pixels in each pair. The standard EM algorithm is then applied to the set of all the raw measures to estimate the parameters of a Gaussian mixture model with two components. Because the outlier distribution should be close to a uniform distribution, the inlier distribution is the component with the smaller σ. Then, $B_x = N_x(\mu_b^x, \sigma_b^x)$ and $G_x = N_x(\mu_g^x, \sigma_g^x)$ where N denotes a normal distribution and $\sigma_g^x < \sigma_b^x$.

Figure 15:
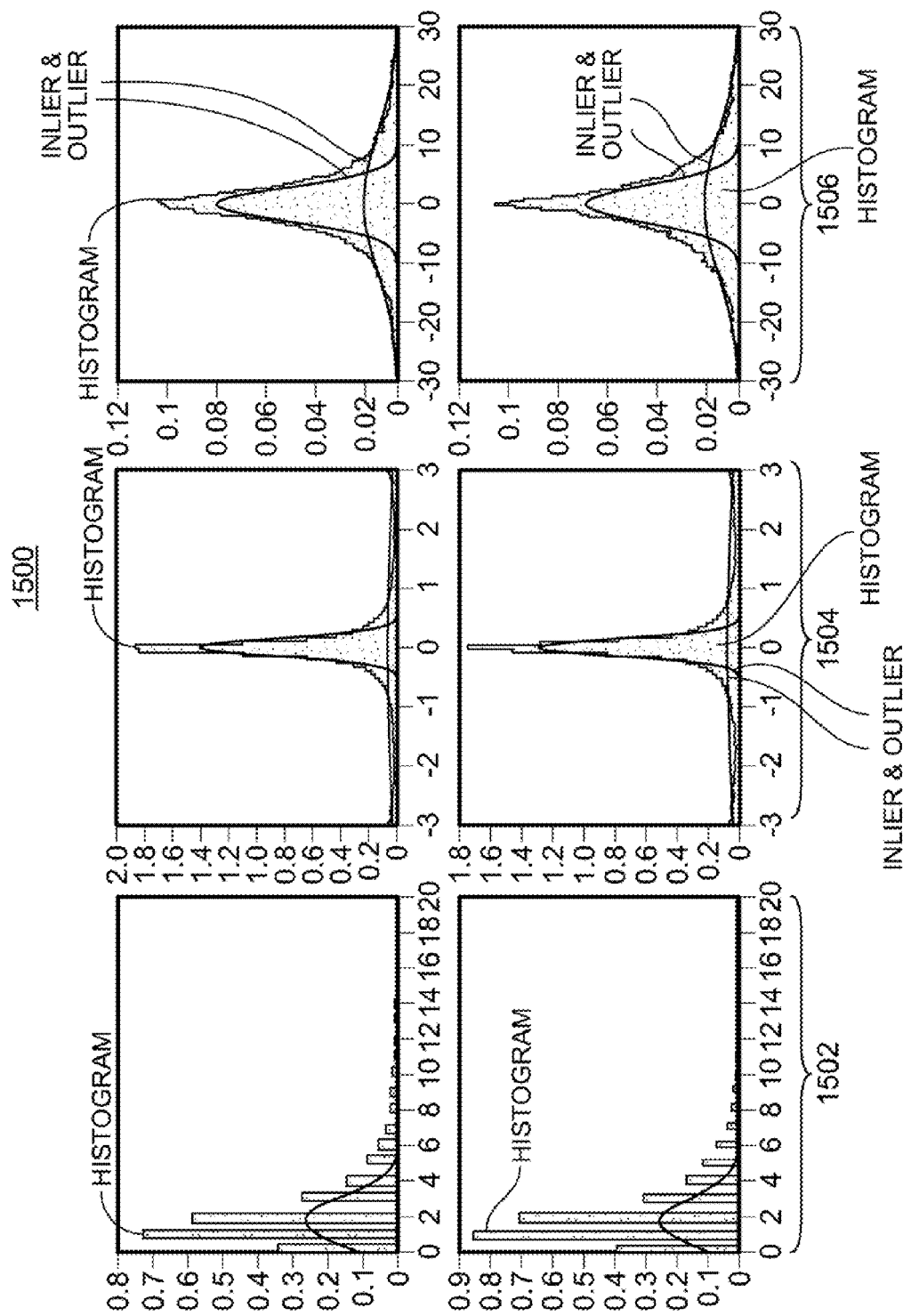
FIG. 15 is a block diagram illustrating example estimated inlier and outlier distributions overlaid with the corresponding histograms for two different pairs of cameras.

FIG. 15 is a suite of graphs illustrating example estimated inlier and outlier distributions overlaid with the corresponding histograms 1500 for two different pairs of the non-overlapping cameras 102 in accordance with a point-wise distance 1502, an angular difference 1504, and a magnitude distance 1506. There are three types of matches, exact 1312, close 1314, and outlier 1316 (see FIG. 13). To distinguish between these types in the match measure, a threshold level is determined to define an outlier, i.e., how far away is too far away. In one embodiment, the threshold is given by equation (9). After computing the one or more of the raw measures (e.g., distance 1402, angular difference 1404, and/or magnitude difference 1406), inliers are distinguished from outliers.

FIG. 16 is a table 1600 that lists exemplary parameters of inlier distributions of three raw measures for 8 pairs of the non-overlapping cameras 102. Indices of the non-overlapping cameras 102 are from 1 to 16 for the 8 cameras. Odd numbered and even numbered indices refer to vehicles traveling in the near and far lane, respectively. Each row of table 1600 is a pair of cameras and each pair of cameras has different parameters for these curves.

To ensure the success of the EM algorithm, each component needs to have enough samples. For the results presented in FIG. 15 and FIG. 16, the set $\{M_i \leftrightarrow I_j\}$ contains only those pairs of edge maps that correspond to same vehicles across the two cameras. $B_x$ and $G_x$ can be computed without knowing the ground truth. The inlier distribution for d is more like a Rayleigh distribution.

Learning Discriminant Edge Measures

Given the six-dimensional distance measure, the weight of each individual component in the distance measure is determined such that P(y|D) and P(y|S) of the combined match score y are maximally separated. If y is assumed to be a linear combination of the components of v, this problem can be solved with the Fisher's Linear Discriminants (FLD). Given two sets of n six-dimensional samples $v_{i|i=0, \ldots n-1}\}$ collected from two distinct cameras of the non-overlapping cameras 102, $n_1$ in the set $V_1$ labeled as true matches and $n_2$ in the set $V_2$ labeled as wrong matches. Each vector may be projected onto a line in the direction of w such that $$y_i = w^t v_i, \quad (10)$$

where the original n samples are then divided into the corresponding subset $y_1$ of true matches and $y_2$ of wrong matches. The best line direction w, i.e., the weight vector, can be found by maximizing the criterion function:

$$J(w) = \frac{|\tilde{\mu}_1 - \tilde{\mu}_2|^2}{\tilde{s}_1^2 + \tilde{s}_2^2}, \quad (11)$$

where $\tilde{\mu}_{\{1,2\}}$ are the sample means and $\tilde{s}_{\{1,2\}}^2$ are the scatters for the projected sample sets $y_{\{1,2\}}$. Once the optimal w is obtained, $$P(y|S) = N(\tilde{\mu}_1, \tilde{s}_1^2/n_1)$$

$$P(y|D) = N(\tilde{\mu}_2, \tilde{s}_2^2/n_2) \quad (12)$$

where N denotes a normal distribution.

FIG. 17 is a table listing example weights of the corresponding measures computed for the 8 pairs of the non-overlapping cameras 102. The raw measures (see FIG. 14) are combined into a single measure, a scalar variable. From the raw measures, the equation (6) derives a distance measure, e.g., a six-dimensional vector for a pair of edge maps (see FIG. 13).

The six-dimensional vector provides a measurement of similarity and difference between the two vehicles that are represented by the edge maps. The scalar variable is computed using equation (10). Weights may be tuned to take into account differences in appearance among cameras (e.g., see FIG. 12). However, tuning weights occurs without manually labeling data. This leads to the need for unsupervised learning of weights and distributions. In one embodiment with unsupervised learning, tuning occurs automatically for the non-overlapping cameras 102 in the network so that after about 30 minutes or an hour, all the parameters are in place, without any manual labeling process.

The weights are normalized with the μ and σ of each measure for a meaningful comparison. In most cases, the angular difference has high weight. This is consistent with the observation that adding edge orientation leads to significantly better classification results. The coverage features, such as $c^a$ and $c^m$ are also the measures with large weights. Therefore, a combination of the distance features and the amount of data explained by the inliers is an effective feature set for the problem at hand.

A nice property of this approach is that it automatically selects measures that are important for the particular pair of cameras under consideration. Looking at the distribution of each measure in the table of FIG. 16, the angular measure seems to be most discriminative for the pair of 15 and 11, because the magnitude change between these two cameras is the largest among all the pairs of cameras. In the case of 11 and 7, the magnitude measure plays an important role, because the magnitude change is the smallest among all the pairs of cameras.

Unsupervised Learning of Weights and Distributions

Learning robust and discriminative edge measures may require a large amount of labeled data, which is difficult to obtain for a system with many of the non-overlapping cameras 102. Furthermore, distributions computed at one time of the day may not be suitable for the situation at another time or day.

To address these problems, one embodiment is an unsupervised approach in which robust and discriminative edge measures are learned without labeled data. The algorithm for this embodiment may be executed in a batch mode during run time. For example, the example architecture 100 may collect vehicle images for a certain period of time, e.g., 20 to 30 minutes. An estimation of discriminative distributions is based on the latest data so that the distributions can be adapted to the current situation. As a result, one embodiment may be is able to re-initialize itself without any manual input. The embodiment may also be modified to run in a continuous manner using the distributions that were computed at an earlier time. The algorithm for the unsupervised approach in which robust and discriminative edge measures are learned without labeled data is outlined as follows.

1. Collect an unlabeled set E of aligned pairs of edge maps and ensure that there is sufficient amount of true matches in the sample set;
2. Learn outlier and inlier distributions based on E;
3. Compute the set V of six-dimensional derived measures based on E and the outlier and inlier distributions learned in step 2 and learn the weight w, P(y|D) and P(y|S) from V simultaneously.

Ranking Vehicle Matches for Sample Collection

One challenge of building a representative sample set for unsupervised learning is to collect a sufficient percentage of true matches in the set. This problem is addressed in one embodiment by using a ranking mechanism with time gating as a pre-pruning state.

Consider traffic flow between two of the non-overlapping cameras 102, $C_i$ to $C_j$. Each vehicle image has a time stamp. A vehicle in $C_j$ is said to be time gated with a vehicle in $C_i$ only if its transition time from $C_i$ to $C_j$ is within a certain range of the average transition time between these two cameras. For each vehicle edge map $E_k^j$ in $C_j$, form a candidate list of edge maps of all the vehicles in $C_i$ that time gated with $E_k^j$. For each edge map in $C_k^j$, compute a ranking score and, then, sort the candidate list from high to low according to the score. For each vehicle edge map $E_k^j$, then select K samples with top scores in its candidate list and L samples in the rest of the list and call it the sample set E. The ranking score is defined as:

$$\gamma = \frac{\sum_{M \to l} h(d^p, \delta)h(a^p, \alpha) + \sum_{l \to M} h(d^p, \delta)h(a^p, \alpha)}{N(M) + N(l)} \quad (13)$$

where M and l are the two edge point sets, h(x,c)=p for $|x| \geq c$ and p is a small positive number; $d^p$ and $a^p$ are as in equations (3) and (4). The constants $\delta$ and $\alpha$ are kept the same for all pairs of cameras. The score in equation (13) is in the range of [0,1].

The score converts the point-wise distance and angular difference and their coverages in terms of inliers and outliers into a single linear inverted hat like robust match measure. Edge magnitude differences might not be used for ranking, because they are relatively more sensitive to illumination changes. The ranking score might not be as discriminative as the discriminative match score computed in equation (10) using the six-dimensional edge measures. However, the rank score computation is generally sufficient for relative ordering among candidate matches that help in choosing training data for learning.

FIG. 18 is a table 1800 that lists example ranking results computed for 8 pairs of the non-overlapping cameras 102. Matches for vehicles traveling from $C_i$ to $C_j$ are ranked. The total column 1802 lists a number of total vehicles with ground truthed matches, and a top 2 column 1804 lists the number of true matches that are ranked within the top 2. The table 1800 also shows that the average probability that the true matches are ranked within the top 2 is about 0.9556. In other words, by collecting two top ranked samples and one sample from the rest of the candidate list for each vehicle, on average, about 95.56/3=31.9% of matches are true matches in the resulting sample set E. This is sufficient for unsupervised learning. Other values for unsupervised learning may be used as well.

Estimating Outlier and Inlier Distributions

A two component Gaussian mixture model is fitted to scores in the set E. Each component is essentially the P(γ|D) and P(γ|S) for the score. The component with the large mean accounts for the true matches. Because the score is not optimally designed for separating wrong matches from true matches, samples are conservatively picked as inliers for which P(γ|D)<<P(γ|S). At this stage, the samples are not labeled as true and false matches; and a fitted mixture model is used only to prune the set of scores and the corresponding matches.

Learning Weights and Distributions

Once the outlier and inlier distributions are known, compute a set $V=\{v_0, v_1, \ldots, v_{m-1}\}$ of derived measurement vectors from the sample set E. Compute the weight, w, as in equation (10) along with the discriminative distributions as in equation (12) without explicit labeling of samples.

First, discretize $w \in \Omega \equiv \{I_0, I_1, \ldots, i_{n-1}\}^6$, where n is the number of discrete samples for each of the six dimensions and $I_i$ are the values uniformly distributed in the range of [−1,1] under the assumption that each of the six measures can be normalized within its range. The most discriminative weight W* is then obtained by solving the following optimization problem:

$$\max_{w \in \Omega} J(w) \quad (14)$$

where the objective function is defined as $$\frac{|\mu_1 - \mu_2|^2}{\sigma_1^2 + \sigma_2^2}. \quad (15)$$

Given any w, $\mu_{\{1,2\}}$ and $\sigma_{\{1,2\}}$ are computed by first projecting the set of V onto the direction w and, then, fitting a two-component Gaussian mixture model on the projected samples. In other words, for any hypothesized direction w, the unlabeled samples are described using a two-component mixture model and that model that produces the maximal discrimination is chosen as the final solution.

Solving equation (14) with exhaustive search requires $6^n$ operations, which is tractable only when n is small. When n is large, a Gibbs sampler is employed to explore the discrete solution space efficiently. The Gibbs distribution that corresponds to the objective function in equation (14) is given by:

$$G(w) = \frac{1}{Z}\exp[J(w)/T], \quad (16)$$

where Z is an unknown normalization factor and T is the temperature constant. The local conditional probability can be derived from equation (16) as follows.

$$G(w_j = l_k | \{w_i | i \neq j\}) \quad (17)$$

$$= \frac{G(w_j = l_k | \{w_i\})}{G(\{w_i\})}$$

-continued $$= \frac{G(w_j = l_k\{w_i\})}{\sum_{w_j \in \{l_k | k=0,\ldots,n-1\}} G(w_j, \{w_i\})},$$

where $w_j$ is the jth dimension of w. The unknown factor Z is canceled out in equation (17). In order to compute $G(w_j, \{w_i\}) \equiv G(w^j)$ for all $\{w_k^j | w_j = l_k, k=0, \ldots, n-1\}$, write the projection $Y^k \equiv [y_0^k, \ldots, y_{m-1}^k] = w_k^{jT}[v_0, \ldots, v_{m-1}]$ of the sample set V onto each $w_k^j$ as the following matrix form $$[w_0, \ldots, w_j = l_k, \ldots, w_5] \begin{pmatrix} v_0^0 & \ldots & v_1^0 & \ldots & v_{m-1}^0 \\ \vdots & \ddots & \vdots & \ddots & \vdots \\ v_0^j & \ldots & v_1^j & \ldots & v_{m-1}^j \\ \vdots & \ddots & \vdots & \ddots & \vdots \\ v_0^5 & \ldots & v_1^5 & \ldots & v_{m-1}^5 \end{pmatrix} \quad (18)$$

$$\equiv \{w_{0,j-1}^T, w_j = l_k, w_{j+1,5}^T\} \begin{bmatrix} V^{0,j-1} \\ v^j \\ V^{j+1,5} \end{bmatrix}$$

As seen from equation (18), the following recursive formula computes $Y^k$:

$$Y^0 = w_{0,j-1}^T V^{0,j-1} + w_{j+1,m-1}^T V^{j+1,5}$$

$$Y^{k+1} = Y^k + \eta v^j, \quad (19)$$

where $\eta = l_k - l_{k-1}$, the step between two consecutive levels. From $Y^k$, the $\mu$ and $\sigma$ the Gaussian mixture model and hence $G(w^j)$ can all be computed. The mixture model computed from $Y^k$ can be used to initialize the EM algorithm for $Y^{k+1}$ to save computational time.

Given a random initial guess, the Gibbs sampler sweeps through each dimension $w_j$ sequentially, and then assigns its value according to the local conditional probability in equation (17). The same process is repeated for several iterations and the w that has the smallest G(w) is selected as the solution. Because the objective function is simple and the dimension is relative small, Gibbs sampler can quickly converge to a solution very close to the global optimum.

Figure 19:
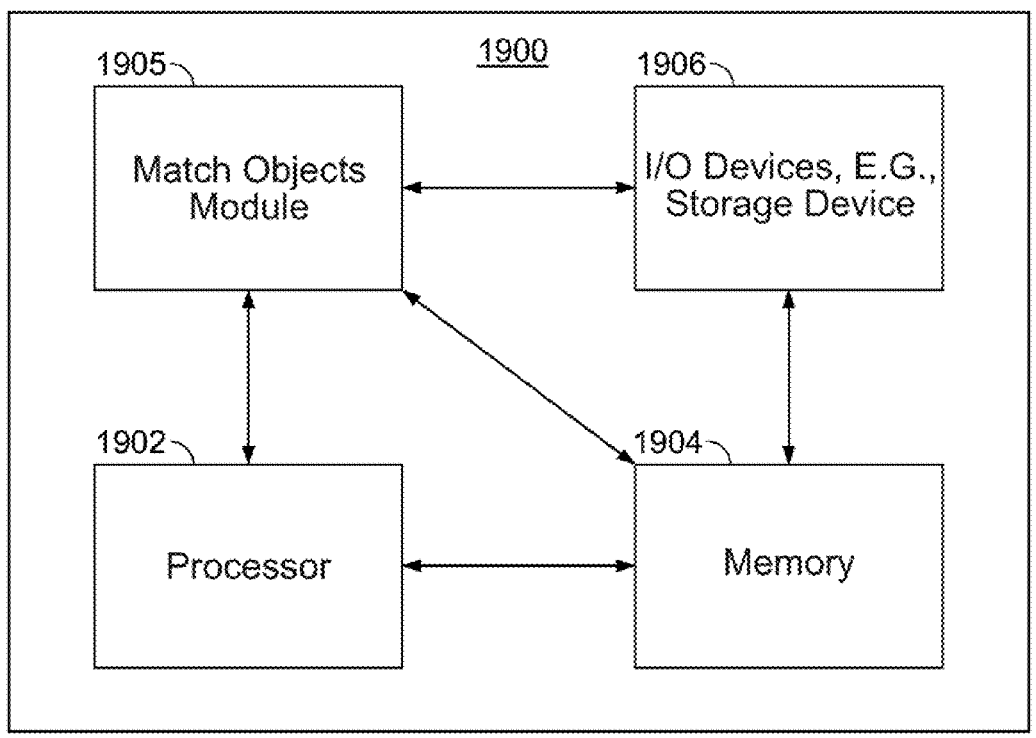
FIG. 19 is a block diagram illustrating an example of a computer suitable for implementing the processes and methods described herein.

To prevent the singular case that only a few samples are assigned to one component of the mixture model, enforce in the sampling process the constraint that the prior iteration for each component also estimated from the EM algorithm should be larger that a threshold. This threshold is related to the percentage of the true matches in the sample set, e.g., around 31.9%. In practice, a practical threshold was found to be about 0.2 for all pairs of the non-overlapping cameras 102. The threshold, however, may be set at other numbers as well FIG. 19 is a block diagram illustrating a high level block diagram of a general purpose computer 1900 suitable for use in performing the functions described herein. The system 1900 includes a processor element 1902 (e.g., a CPU); a memory 1904, e.g., random access memory (RAM) and/or read only memory (ROM); a module 1905 for matching objects between two non-overlapping cameras; and various input/output devices 1906 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 1905 for matching objects between two non-overlapping cameras can be loaded into memory 1904 and executed by processor 1902 to implement the functions as discussed above. As such, the present process 1905 for matching objects between two non-overlapping cameras (including associated data structures) of the present invention can be stored on a computer readable medium or carrier, e.g., RAM memory, magnetic or optical drive or diskette and the like.

CONCLUSION

Exemplary embodiments of an unsupervised learning algorithm to compute robust and discriminative edge measures for matching images of vehicles between non-overlapping cameras are provided. The need to separate edge measures into outlier and inlier distributions was demonstrated. The power of discriminant learning was verified for combining the new set of edge measures into a single match score. An algorithm for unsupervised discriminant learning without explicit or implicit labeling is also provided.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method for unsupervised learning of measures for matching objects between images from at least two non-overlapping cameras, comprising:
   using a processor to perform the steps of:
      collecting at least two pairs of feature maps, wherein the at least two pairs of feature maps are derived from features of objects captured in the images from the at least two non-overlapping cameras;
      computing, as a function of the at least two pairs of feature maps, at least first and second match measures, wherein the first match measure is of a same class and the second match measure is of a different class, and wherein objects in the same class are deemed to match; and
      learning from the at least two pairs of feature maps outlier and inlier distributions, wherein determining the first and second match measures, comprises: computing, as a function of the outlier and inlier distributions, a weight for each of the first and second match measures, and probabilities for the first and second match measures being of the same and different classes.

2. The method of claim 1, wherein computing at least first and second match measures: determining a weight of at least one of the at least first and second match measures, wherein the weight is indicative of the same class or the different class.

3. The method of claim 1, further comprising: using discriminative feature detection of objects captured in the images to derive the feature maps.

4. The method of claim 1, wherein computing at least first and second match measures comprises: deriving at least one measurement vector from differences between oriented features of the objects captured in the images.

5. The method of claim 4, further comprising: projecting the at least one measurement vector to a one-dimensional projection along a line defined by a weight for each of the first and second match measures so as to maximize a separation between the same class and the different class.

6. The method of claim 4, wherein the at least one measurement vector has at least 2 dimensions.

7. The method of claim 1, wherein computing the probabilities of the first and second match measures comprises: fitting to a Gaussian distribution the same class and the different class.

8. The method of claim 1, wherein collecting, determining and computing are performed automatically on a periodic basis.

9. An apparatus for matching objects between images from at least two non-overlapping cameras, comprising:
  means for collecting at least two pairs of feature maps, wherein the at least two pairs of feature maps are derived from features of objects captured in the images; and
  means for computing, as a function of the at least two pairs of feature maps, at least first and second match measures, wherein the first match measure is of a same class and the second match measure is of a different class, and wherein objects in the same class are deemed to match; and
  means for learning from the at least one two pairs of feature maps outlier and inlier distributions, wherein the means for computing the first and second match measures comprises: means for computing, as a function of the outlier and inlier distributions, a weight for each of the first and second match measures, and probabilities for the first and second match measures being of the same and different classes.

10. The apparatus of claim 9, wherein the means for determining a same class and a different class comprises: a means for determining a weight of the first and second match measures, wherein the weight is indicative of any of the same class and the different class.

11. The apparatus of claim 9, further comprising: a means for deriving the feature map via discriminative feature detection of objects captured in the images.

12. The apparatus of claim 9, wherein the means for computing the first and second match measures comprises: means for deriving at least one measurement vector from differences between oriented features of the objects captured in the images.

13. The apparatus of claim 12, wherein the means for computing the first and second match measures the further comprises: projecting the at least one measurement vector to a one-dimensional projection along a line defined by a weight for each of the first and second match measures so as to maximize a separation between the same class and the different class.

14. The apparatus of claim 9, wherein means for computing the probabilities of the first and second match measure comprises: means for fitting to a Gaussian distribution the same class and the different class.

15. A computer implemented method for unsupervised learning of measures for matching objects between images from at least two non-overlapping cameras, comprising:
  using a processor to perform the steps of:
    collecting at least two pairs of feature maps, wherein the at least two pairs of feature maps are derived from features of objects captured in the images from the at least two non-overlapping cameras;
    learning from the at least two pairs of feature maps respective outlier and inlier distributions; and
    computing, as a function of the at least two pairs of feature maps and the respective outlier and inlier distributions, at least first and second match measures, wherein the first match measure is of a same class and the second match measure is of a different class, and wherein objects in the same class are deemed to match.

16. The method of claim 15, wherein learning from the at least two pairs of feature maps respective outlier and inlier distributions comprises ranking the feature maps as a function of the features of the objects captured in the images.

17. The method of claim 16, wherein the images are unlabeled.

18. The method of claim 15, wherein computing at least first and second match measures comprises: deriving at least one measurement vector from differences between oriented features of the objects captured in the images.

* * * * *